No. 645,316. Patented Mar. 13, 1900.
N. ERNST.
APPARATUS FOR HEATING MILK.
(Application filed Jan. 29, 1900.)
(No Model.)
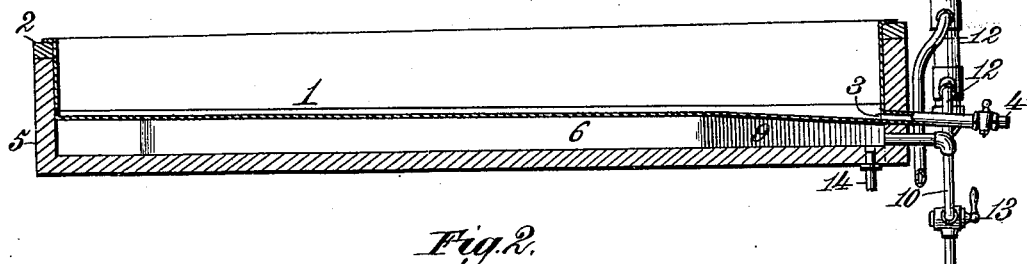
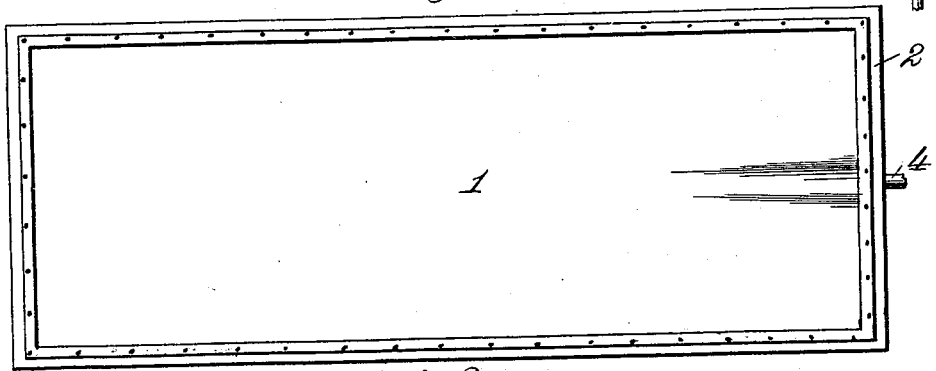
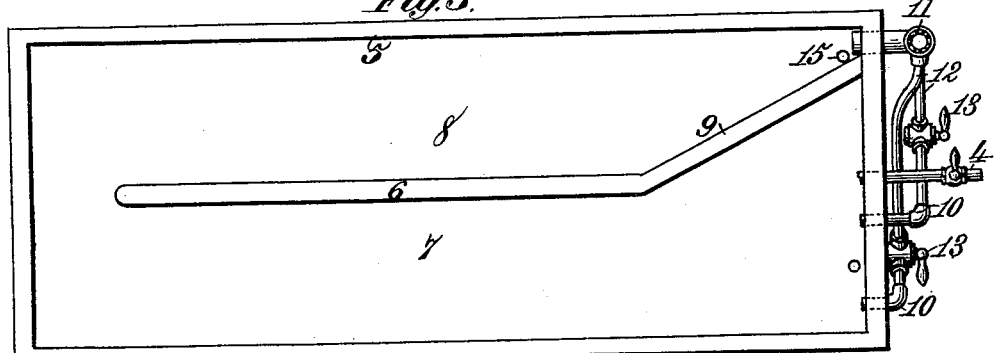
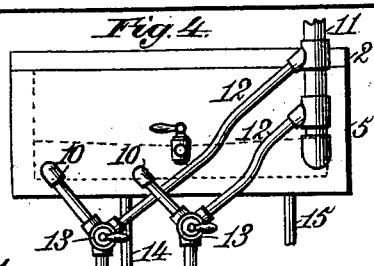 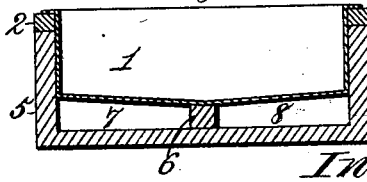
Witnesses.
Robert Everett
Inventor.
Noah Ernst.
By James L. Norris
Atty.
THE NORRIS PETERS CO., PHOTO-LITHO., WASHINGTON, D. C.

UNITED STATES PATENT OFFICE.

NOAH ERNST, OF GREEN VILLAGE, PENNSYLVANIA.

APPARATUS FOR HEATING MILK.

SPECIFICATION forming part of Letters Patent No. 645,316, dated March 13, 1900.

Application filed January 29, 1900. Serial No. 3,187. (No model.)

*To all whom it may concern:*

Be it known that I, NOAH ERNST, a citizen of the United States, residing at Green Village, in the county of Franklin and State of Pennsylvania, have invented new and useful Improvements in Apparatus for Heating Milk, of which the following is a specification.

The object of my invention is to provide a simple and improved apparatus for heating milk prior to its introduction into a separator, the same utilizing the exhaust-steam from the motor or motors which drive the separator as the heating medium.

The invention consists of a pan or receptacle for the milk having a discharge-opening in one end thereof, a heating-chamber beneath said pan having a diaphragm or partition extending from one end thereof to a point adjacent to its opposite end, forming two communicating compartments, an inlet-pipe for the heating medium leading into one of said compartments, an escape-pipe leading from the other of said compartments, a branch pipe connecting said inlet and escape pipes outside the heating-chamber, and a valve for controlling the passage of the heating medium through said inlet and branch pipes.

The invention also consists in certain features and details of construction and combinations of parts, which will be hereinafter more fully described and claimed.

In the drawings forming part of this specification, Figure 1 is a central longitudinal sectional view of my improved apparatus. Fig. 2 is a plan view of the milk-pan. Fig. 3 is a similar view of the heating-chamber. Fig. 4 is a front end elevation, and Fig. 5 is a cross-section.

Like reference-numerals indicate like parts in the different views.

The pan 1 for the milk to be treated is preferably rectangular in shape and constructed of tin or other sheet metal, secured along its edges to a frame 2. The bottom of said pan 1 is inclined slightly from the supply end to the discharge end thereof, and in the latter end is formed a discharge-opening 3, with which connects a valved discharge-pipe 4, leading to the separator or other place to which the milk is to be delivered. The bottom of said pan is further formed with a depression extending longitudinally thereof and located intermediate of its side edges, the said depression and the said inclination of the bottom of said pan being provided for the purpose of enabling the same to be completely drained through the pipe 4.

Beneath the pan 1 is a heating-chamber 5, preferably made up of a rectangular frame having an open upper end. Fitting within the open upper end of said frame is the pan 1, the same being supported by the engagement of the pan-frame 2 with the upper edges of the side bars of the rectangular frame of which said heating-chamber is made. Extending longitudinally of the heating-chamber 5 is a partition 6, which divides said chamber into two compartments 7 8, respectively. The said partition throughout the greater part of its length is disposed centrally of the heating-chamber; but one end thereof is deflected or inclined, as shown at 9, and terminates at a point adjacent to one corner of said chamber. The opposite end of said partition terminates a short distance from the opposite end of the heating-chamber, so that a passage is provided between the two compartments 7 and 8. Leading into the compartment 7 of the heating-chamber at a point just beneath the discharge end of the pan 1 are two inlet-pipes 10 10, the same conveying exhaust-steam from the motor or motors which drive the separating apparatus. Leading from the compartment 8 of the heating-chamber at a point beneath the discharge end of the pan 1 is an escape pipe or flue 11, from which the steam or other heating medium employed may pass off to the atmosphere after it has been utilized in the heating-chamber 5. Connecting the inlet-pipes 10 10 with the escape-pipe 11 are branch pipes 12 12, and at the point of intersection of said branch pipes with said inlet-pipes are provided two-way cocks or valves 13 for controlling the passage of steam. Adjacent to the end of the compartment 7 is provided an escape or drip opening 14 for water of condensation, and a similar drip-opening 15 is provided at a corresponding point in the compartment 8.

Constructed as above described, the operation of my device is as follows: The milk to be heated is delivered into the pan 1 adjacent to the upper end thereof and simultaneously the cock or cocks 13 are turned so as to cause exhaust-steam from the separator motor or motors to pass through the pipe or pipes 10 into the compartment 7 of the heating-chamber 5. Entering this chamber, the steam is caused to traverse the whole length thereof beneath the pan 1, pass into the compartment 8 on the opposite side of the partition 6, and escape through the escape pipe or flue 11. In this passage of the steam through the two compartments of the heating-chamber the heat thereof is imparted to the milk in the pan 1 and the temperature of the milk thereby raised. Any water of condensation in either one of the compartments 7 or 8 of the heating-chamber is allowed to pass off through the drip-openings 14 and 15. When the milk in the pan 1 has reached the proper temperature, which may be readily ascertained at any time by thermometers which are placed therein, the cock or cocks 13 are turned so as to cut off the supply of steam to the compartment 7 through the pipe or pipes 10 and conduct the same directly to the escape-pipe 11. In this way overheating of the milk may be avoided and the temperature of the same may be readily controlled.

Having now described my invention, what I claim as new, and desire to secure by Letters Patent, is—

1. In an apparatus for heating milk, the combination with a pan or receptacle for the milk, of a heating-chamber beneath the same having a partition therein dividing the same into two compartments communicating with each other at one end, an inlet-pipe for the heating medium entering one of said compartments, an escape-pipe communicating with the other of said compartments, a branch pipe connecting said inlet and escape pipes outside the heating-chamber, and means for controlling the passage of the heating medium through said inlet and branch pipes.

2. In an apparatus for heating milk, the combination with a pan or receptacle for the milk, of a heating-chamber beneath the same having a partition therein dividing the same into two compartments communicating with each other at one end, an inlet-pipe for the heating medium entering one of said compartments, an escape-pipe communicating with the other of said compartments, a branch pipe connecting said inlet and escape pipes outside the heating-chamber, and means for controlling the passage of the heating medium through said inlet and branch pipes, each of said compartments being provided with drip or escape openings for water of condensation adjacent to the points of connection of said inlet and escape pipes therewith.

3. In an apparatus for heating milk, the combination with a pan or receptacle for the milk, having its bottom inclined from one end to the other and provided with a central depression extending from one end to the other, and a discharge-pipe leading from the central portion of the lower end of said pan, of a heating-chamber beneath said pan having a partition therein dividing the same into two compartments which communicate with each other at one end, an inlet-pipe for exhaust-steam leading into one end of one of said compartments, an escape-pipe leading from the corresponding end of the other of said compartments, a branch pipe connecting said inlet and escape pipes, and a two-way valve at the point of connection of said inlet and branch pipes, each of said compartments being provided with a drip or escape opening for water of condensation at the end thereof adjacent to the respective points of communication of said inlet and escape pipes therewith.

In testimony whereof I have hereunto set my hand in presence of two subscribing witnesses.

NOAH ERNST.

Witnesses:
WM. M. STOCKBRIDGE,
GEO. W. REA.